United States Patent
Qureshi

(10) Patent No.: US 9,959,019 B1
(45) Date of Patent: May 1, 2018

(54) CUSTOMIZABLE MEDIA PLAYER FRAMEWORK

(71) Applicant: Amazon Technologies, Inc., Reno, NV (US)

(72) Inventor: Aneeb Naveed Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 13/868,506

(22) Filed: Apr. 23, 2013

(51) Int. Cl.
  *G06F 3/0484* (2013.01)
  *G06F 9/445* (2006.01)
  *G06Q 50/00* (2012.01)

(52) U.S. Cl.
  CPC ........ *G06F 3/0484* (2013.01); *G06F 9/44526* (2013.01); *G06Q 50/01* (2013.01)

(58) Field of Classification Search
  CPC ............................ G06Q 50/01; G06F 9/44526
  USPC ............... 709/201–203, 217–220, 223–231; 719/328–329; 715/716
  See application file for complete search history.

(56) References Cited

U.S. PATENT DOCUMENTS

| | | | | |
|---|---|---|---|---|
| 8,566,395 B2 * | 10/2013 | Shi et al. | ...................... | 709/203 |
| 8,589,862 B2 * | 11/2013 | George | ............... | G06F 9/44526 717/104 |
| 2006/0026591 A1 * | 2/2006 | Backhouse et al. | .......... | 717/177 |
| 2006/0117105 A1 * | 6/2006 | Lesenne | .............. | G06F 9/44526 709/226 |
| 2007/0240134 A1 * | 10/2007 | Buragohain et al. | ......... | 717/140 |
| 2009/0088188 A1 * | 4/2009 | Wormald | ................ | H04W 4/18 455/466 |
| 2009/0300597 A1 * | 12/2009 | George | ............... | G06F 9/44526 717/173 |
| 2010/0287474 A1 * | 11/2010 | Feng et al. | ..................... | 715/716 |
| 2010/0325543 A1 * | 12/2010 | Williams et al. | .............. | 715/716 |
| 2011/0055209 A1 * | 3/2011 | Novac et al. | .................. | 707/737 |
| 2011/0183613 A1 * | 7/2011 | Nocera | ......................... | 455/41.2 |
| 2012/0030672 A1 * | 2/2012 | Zygmuntowicz | ......... | G06F 8/60 718/1 |
| 2012/0054777 A1 * | 3/2012 | Xiques et al. | ................. | 719/318 |
| 2012/0278439 A1 * | 11/2012 | Ahiska | ................... | H04L 65/105 709/218 |
| 2013/0263088 A1 * | 10/2013 | Hoff et al. | ..................... | 717/121 |
| 2014/0289622 A1 * | 9/2014 | Riggs et al. | .................. | 715/716 |

* cited by examiner

*Primary Examiner* — Ryan Barrett
*Assistant Examiner* — Maria S Ayad
(74) *Attorney, Agent, or Firm* — Thomas | Horstemeyer, LLP

(57) ABSTRACT

Disclosed are various embodiments for a media player customization application. A media player framework defines basic functionality to render media items. Plugins may be added to the media player framework to implement desired functionality. The plugin model allows for a media player to minimize file sizes by only included required functionality.

20 Claims, 5 Drawing Sheets

CUSTOMIZABLE MEDIA PLAYER FRAMEWORK

BACKGROUND

The features and capabilities of a media player often affect the file size of the media player. Unneeded features of a media player increase the overall size without benefit to media content providers or users. The file size of an embedded media player should be minimized to reduce network traffic and expedite the beginning of media playback. A flexible media player framework allows for media content providers to only include desired features, preventing unnecessary increases in the file size of the media player.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
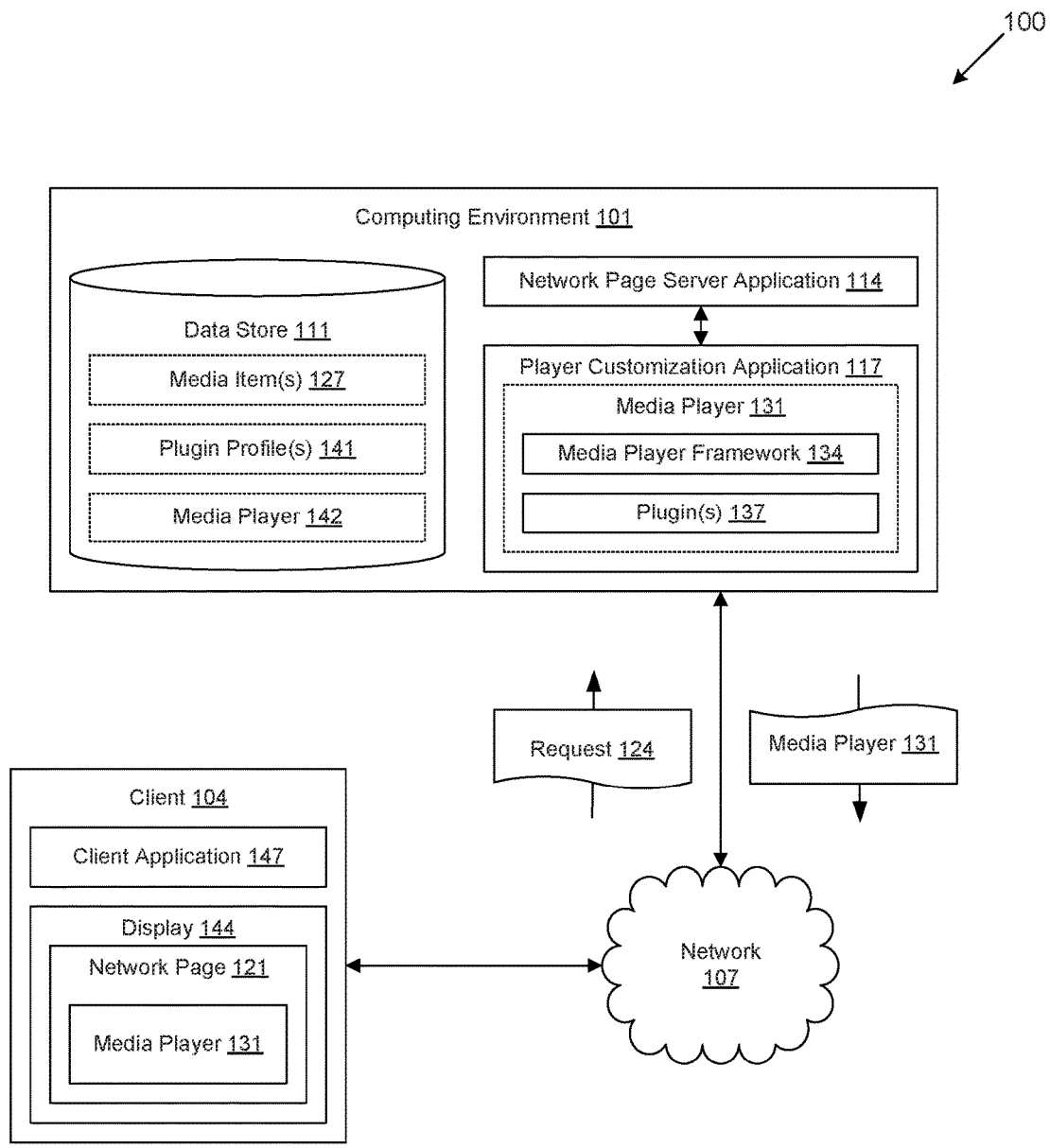
FIG. 1 is a drawing of a networked environment according to various embodiments of the present disclosure.

Network pages browsed by users often contain embedded media items, such as audio or video. For example, a network page may comprise an advertisement comprising a video soliciting a product to a client viewing the network page. As another example, a network page may comprise an embedded video player to stream long-form video content such as a television show or movie. The server communicating the media items to the client may also communicate a media player to the client to facilitate playback. By communicating the media player to the client instead of accessing a media player pre-installed on the client, the content providers can ensure that the client can render the content and be presented with desired features or functionality.

Because the media player must be downloaded by the client prior to playing the media content, the time spent downloading the media player results in a delay in beginning playback. The size of the media player may be determined by what functionality or capabilities are implemented in the media player. As new features or functionality is added to the media player, the overall size will increase. Conversely, a media player with only a minimum amount of functionality will have a reduced file size. Therefore, large media players may have more functionality with respect to a smaller media player, but result in a more significant delay in beginning playback when used to render embedded content.

It is often beneficial to minimize the delay in starting playback of media items. For example, a reduced delay in beginning playback of a video advertisement embedded in a web page may increase interactions with the advertisement or conversion rates. However, a longer delay may be more tolerable in preparing a client to render long-form video content. A media item provider may wish to tailor the media player to the type of content being presented, or customize the player to implement certain features.

According to various embodiments of the present disclosure, a player customization application selects plugins for a media player framework based on specified playback requirements. The media player framework comprises basic media playback functionality. The plugins define additional features or playback requirements to be implemented in conjunction with rendering a media item. This facilitates minimizing the file size of the media player as only the functionality required to render a particular media item is included in the player. This also allows for the same media player framework to be used for generating media players of varying sizes.

The plugins may be added to the media player framework before communicating the media player to the client. The plugins may also be added to a media player already communicated to the client, allowing for a smaller media player to be communicated to the client to expedite the beginning of playback, and then allow additional features to be added to the player while a media item is streaming. The plugins required for a corresponding media item may be defined by a content provider or another user.

In the following discussion, a general description of the system and its components is provided, followed by a discussion of the operation of the same.

With reference to FIG. 1, shown is a networked environment 100 according to various embodiments. The networked environment 100 includes a computing environment 101, and a client device 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a network page server application 114, a player customization application 117, and other applications, services, processes, systems, engines, or functionality not discussed in detail herein. The network page server application 114 is executed to encode for rendering by the client 104 network pages 121 such as web pages or other network pages. The network page server application 114 may serve network pages 121 responsive to a request 124 for content communicated by the client 104 to the computing environment 101, or by another approach.

The network page 121 may comprise navigation aids or links to content to be embedded in the network page 121 upon rendering by a client 104. For example, the network page 121 may comprise navigation aids to an embedded media item 127 to be rendered by the client 104. Media items 127 comprise media content renderable by a client 104, such as video content, audio content, audio/video content, or other content as can be appreciated. Media items 127 may comprise pre-generated content such as an encoded video or audio file. Media items 127 may also comprise a live stream or feed, such as a live video stream, live audio stream, other content.

For example, the network page 121 may comprise a webpage having a banner or sidebar video media item 127 serving as an advertisement for a product. This allows the video media item 127 to be rendered without obstructing the view of other content encoded in the webpage. As another example, the network page 121 may comprise embedded long-form media items 127 such as a television show or movie. The network page 121 may also comprise other data.

The player customization application 117 is executed to generate a media player 131 for communication to a client 104 via the network 107. The media player 131 is executable by a client 104 to facilitate rendering a media item 127 embedded in a network page 121. To this end, the player customization application 117 accesses a media player framework 134 into which a selection of plugins 137 are added in order to generate a media player 131 implementing the functionality required to render the media item 127 on the client 104.

The media player framework 134 is a component of a media player 131 which comprises functionality required to implement a base set of rendering actions with respect to media items 127. Such actions may include playing, pausing, stopping, rewinding, fast-forwarding, or other actions. The media player framework 134 also implements an extensibility model to allow additional functionality to be added to a media player 142 comprising the media player framework 134 via plugins 137, thereby generating a new media player 131.

The plugins 134 comprise modular implementations of functionality to be added to media player 142 comprising the media player framework 134 in order to generate a new media player 131. The new media player 131 implements functionality required to render a media item 127. Plugins 134 may implement playback or rendering functionality, such as adaptive bitrate streaming, media codecs, user interface skins or templates, media format renderers, or other functionality. Plugins 134 may also implement functionality to facilitate client 104 interactions with respect to services or network sites accessible via the network 107. For example, plugins 134 may facilitate access to a social networking or messaging service to allow a client 104 to share the media item 127 to other clients 104 or perform other actions with respect to the media item 127. This may comprise implementing a content overlay, popup window, or other user interface element during a rendering of the media item 127.

As another example, plugins 134 may facilitate interactions with an electronic commerce system or network site associated with a product or service advertised in a media item 127. This may comprise, for example, overlaying an "Add to Cart" button while rendering the media item 127 which, when clicked, adds an advertised product or service to a shopping cart of an electronic commerce system. Other functionality may also be implemented by the plugins 137.

The plugins 137 may be organized into an ontology embodying dependencies or restrictions between plugins 137 as included in a media player 131. For example, adding one of a group of dependent plugins 137 to a media player 131 may necessitate the remainder of the dependent plugins to the media player 131. As another example, two or more plugins 137 may be restricted with respect to each other such that only one or a limited subset of the plugins 137 may be included in a common media player 131.

To select plugins 137 required for rendering a media item 127, the player customization application 117 may access a plugin profile 141 defining a selection of plugins 137. The plugin profile 141 may be defined with respect to one or more media items 127, such that a media player 131 generated to render those media items 127 will comprise the selection of plugins 137 defined in the respective plugin profile 141. The plugin profiles 141 may also be defined with respect to a customer, content provider, or other entity such that media items 127 provided by or otherwise associated with that entity result in a media player 131 having the plugins 137 defined in the respective plugin profile 141. The plugin profiles 141 may also be defined with respect to other entities, or by another approach.

The data stored in the data store 111 includes, for example, media items 127, media players 142, plugin profiles 141, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 144. The display 144 may comprise, for example, one or more devices such as liquid crystal display (LCD) displays, gas plasma-based flat panel displays, organic light emitting diode (©LED) displays, LCD projectors, or other types of display devices, etc.

The client 104 may be configured to execute various applications such as a client application 147 and/or other applications. The client application 147 may be executed in a client 104, for example, to access network content served up by the computing environment 101 and/or other servers. To this end, the client application 104 may comprise, for example, a browser, a dedicated application, etc. to obtain and render network pages 121 or other network content that includes an embedded media player 131. The client 104 may be configured to execute applications beyond the client application 147 such as, for example, email applications, social networking applications, word processors, spreadsheets, and/or other applications.

Next, a general description of the operation of the various components of the networked environment 100 is provided. To begin, the player customization application 117 maintains a media player framework 134 to which plugins 137 are added to generate media players 131. In some embodiments, the player customization application 117 may encode for rendering by a client 104 a user interface to facilitate a generation of plugin profiles 141. The user interface may comprise functionality to select one or more plugins 137 to be included in a media player 131 generated to render one or more selected media items 127. The player customization application 117 may also implement other functionality to generate plugin profiles 141, such as an exposed application program interface, a web service accessible to a client 104, or other functionality.

The client 104 communicates a request 124 to the computing environment 101 for content into which a media item 127 rendered by a media player 131 will be embedded. The content may comprise a network page 131 communicated by a network page server application 114, or other content as can be appreciated. This may be facilitated by a browser client application 147, a dedicated client application 147, or other functionality implemented in the client 104.

The client 104 may then obtain the network page 131 which comprises a navigation aid or reference to an embedded media item 127. In such an embodiment, the client 104 then communicates a request 124 to the computing environment requesting the media player 131 to render the media item 127 such that the network page 121 and the media item 127 may be rendered concurrently by the client 104.

For example, the client 104 may request a network page 121 which has a video advertisement embedded in it. The video advertisement may comprise an embedded link or navigation aid directed to a media item 127, or other data. After a browser client application 147 begins rendering the network page 121, the browser client application 147 detects the embedded navigation aid. The browser client application 147 will then generate a request 124 to the player customization application 117 for a media player 131 to render the media item 127 embedded in the network page.

After obtaining the request 124, the player customization application 117 generates a media player 131 to render the media item 127 to be embedded in the network page 121. In some embodiments, this comprises loading a previously generated media player 131 from a data store 111 for communication to the client 104. In other embodiments, this comprises selecting one or more plugins 137 to be added to a media player 142 comprising the media player framework 134 based at least in part on a defined list of plugins 137 embodied in a plugin profile 141 corresponding to the media item 127 to be rendered.

After selecting the selection of plugins 137, the player customization application 117 adds the plugins to a media player 131 comprising the media player framework 134 to generate a new media player 131. This may comprise, for example, generating one or more new files embodying the media player framework 134 and the plugins 137, by recompiling, packaging, or otherwise encapsulating the media player framework 134 and plugins 137. This may also comprise moving, copying, or otherwise locating the plugins 137 in a file system location accessibly to the media player framework 134 component of the media player 131. For example, the media player framework 134 may be configured to access those plugins 137 located in a predefined directory or location in a file system or file package, and the player customization application 117 copies or includes the plugins 137 at that location.

In some embodiments, one or more of the plugins 137 may be communicated to an instance of a media player 131 executed in a client 104. For example, a media player 131 may be generated which comprises a subset of the selected plugins 137 required to begin rendering of a media item 127 on a client 104. The generated media player 131 may also comprise the media player framework 134 and exclude any additional plugins 137. After communicating the media player 131 to the client 104, the player customization application 117 may then communicate additional plugins 137 to the media player 131 concurrent to the media item 127 being rendered. This allows for further functionality to be implemented by the media player 131 during or after concluding the rendering of the media item 127.

For example, the player customization application 117 may generate a media player 131 comprising a media codec plugin 137 to render a media item 127. After communicating the media player 131 to the client 104, which then begins rendering the media item 127, the player customization application 117 may then communicate a social media sharing plugin 137 to the media player 131 to allow a user of the client 104 to share the media item 127 on a social network after playback has concluded.

In embodiments in which a subset of the plugins 137 is communicated to an instance of a media player 131 executed in a client 104 the subset of plugins 137 may be determined by a predefined selection of the plugins 137. For example, a plugin profile 141 may indicate which of the defined plugins 137 must be included in an instance of the media player 131 prior to communication to the client 104, and which plugins 137 may be communicated to the client 104 after the instance of the media player 131.

In other embodiments, the subset of the plugins 137 may be dynamically generated as a function of a predefined data size threshold with respect to a generated media player 131. For example, a media item 127 may be associated with a maximum data size for a media player 131 in order to minimize the overall file size of the media player 131 to expedite beginning playback of the media item 127. The player customization application 117 may then select a number of the plugins 137 to be added to a base media player 131 comprising the media player framework 134 such that the generated media player 131 has a data size less than the data size threshold. The data size threshold may be predefined, calculated as a function of a playback length or other attribute of the media item 127, or calculated by another approach. Additionally, available network bandwidth or other criteria may also be used to determine the subset of plugins 137 added to an instance of the media player 131 after communicating the instance of the media player 127 to the client 104.

Communicating a plugin 137 to an instance of a generated media player 131 for addition to the generated media player 131 may comprise communicating a plugin 137 via the network 107 by accessing push functionality or an application program interface call exposed by the instance of the media player 131 executed in the client 104. In other embodiments, communicating a plugin 137 to an instance of a generated media player 131 for addition to the generated media player 131 may comprise the media player 131 being configured to automatically obtain the plugin 137 from the player customization application 117 via an exposed web service, application program interface, or by another approach.

The player customization application 117 may store generated media players 131 in a data store 111 to facilitate a later retrieval of the media player 131. For example, if a media player 131 matching a plugin profile 141 is stored in the data store 111, the player customization application 117 may load that media player 142 from the data store 111 for communication to a client 104.

After being communicated to the client 104, the media player 131 then renders the corresponding media item 127 as embedded in the network page 121. This may comprise the client 104 executing the functionality implemented in the plugins 137 of the media player 131, the media framework 134, and potentially other functionality. In some embodiments, the media player 131 communicated to the client 104 comprises less than the entirety of plugins 137 selected for inclusion by the player customization application 117. In such an embodiment, the media player 131 may communicate with the player customization application 117 to obtain the remainder of the plugins 137 concurrent to the media item 127 being rendered.

For example, the media player 131 communicated to the client 104 may exclude a social media plugin 137. The social media plugin 137 may be communicated to the client 104 while the media item 127 is being rendered. Once playback of the media item 127 has ended, the media player 131 may then execute the social media plugin 137 to allow the client 104 to share or otherwise promote the media item 127 on an associated social media network.

Figure 2:
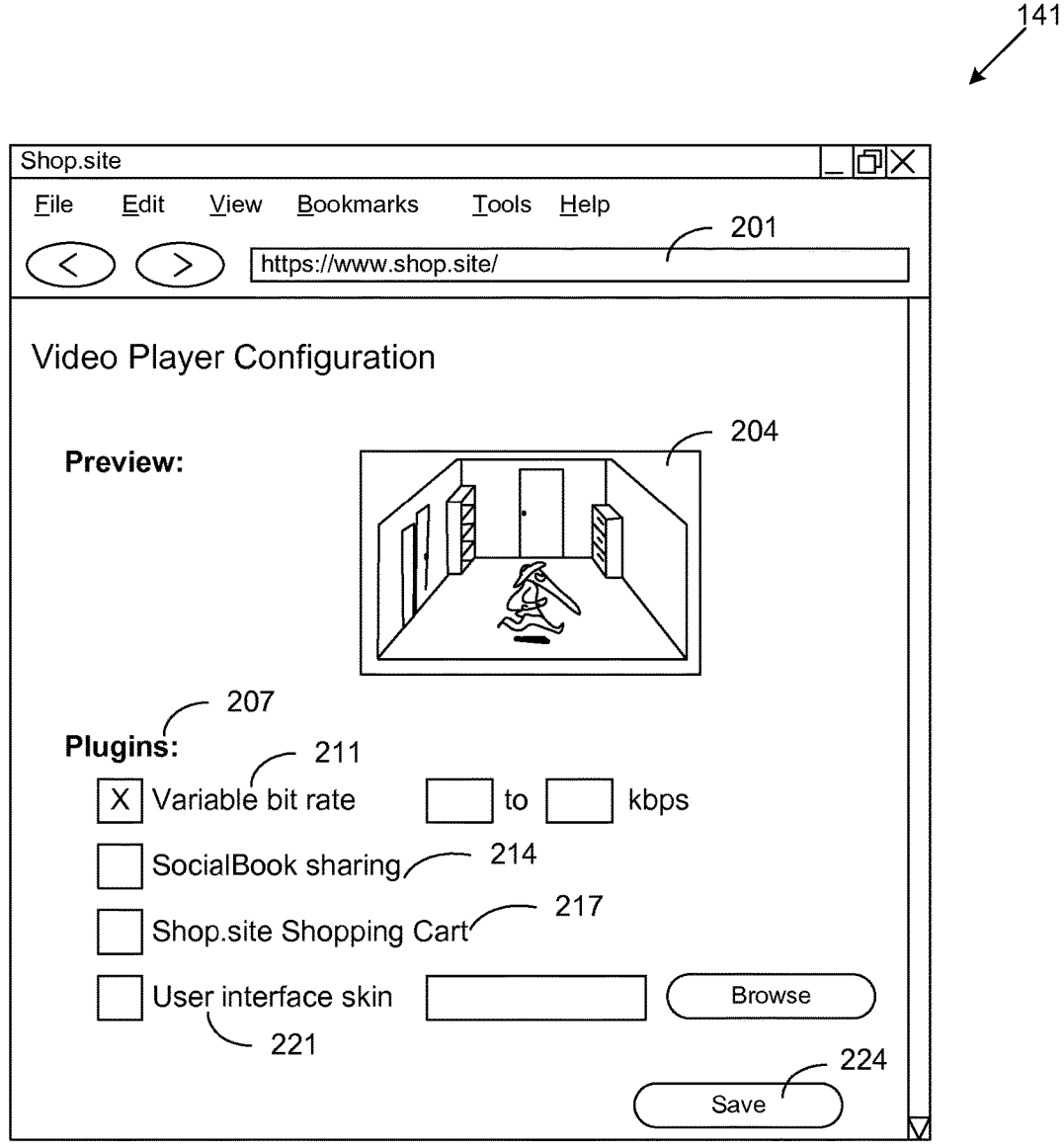
FIG. 2 is a drawing of an example of a user interface rendered by a client in the networked environment of FIG. 1 according to various embodiments of the present disclosure.

Referring next to FIG. 2, shown is an example user interface generated by the player customization application 117 (FIG. 1) to facilitate a generation of a plugin profile 141 (FIG. 1) to be associated with a media item 127 (FIG. 1). The user interface depicted in FIG. 2 may comprise a network page 121 (FIG. 1) communicated by a network page server application 114 (FIG. 1) and encoded for rendering by a browser client application 147 (FIG. 1). In the alternative, the user interface depicted in FIG. 2 may comprise data encoded for rendering by a dedicated client application 147.

Item 201 represents a Uniform Resource Locator (URL) directing the client 104 to content generated by the player customization application 117. Item 204 is a preview window rendering a preview of a media item 127 (FIG. 1) to be rendered by a media player 131 (FIG. 1) comprising the plugins 137 (FIG. 1) included in the plugin profile 141 generated by the user interface of FIG. 2. Item 207 is a list of plugins 137 selectable by a user for inclusion in the plugin profile 141.

Item 211 is a list selection corresponding to a plugin 137 implementing adaptive bit rate functionality for a media player 131. Included in item 211 are input fields to define a range of bit rates in which adaptive bit rate functionality operates. Item 214 is a list selection corresponding to a plugin 137 to facilitate a sharing of the corresponding media item 127 on a social network. Item 217 is a list selection corresponding to a plugin 137 which allows an addition of a product advertised in the rendered media item 127 to be added to a shopping cart of an electronic commerce service.

Item 221 is a list selection corresponding to a plugin 137 which allows for customizable user interface skins to be applied to a media player 131. Also included in item 221 is an input field to facilitate an upload of a user interface skin to be applied to the media player 131 generated as a function of the plugin profile 141 generated in FIG. 2. Item 224 is a save button which, when clicked, generates the plugin profile 141 embodied in the user interface.

Figure 3:
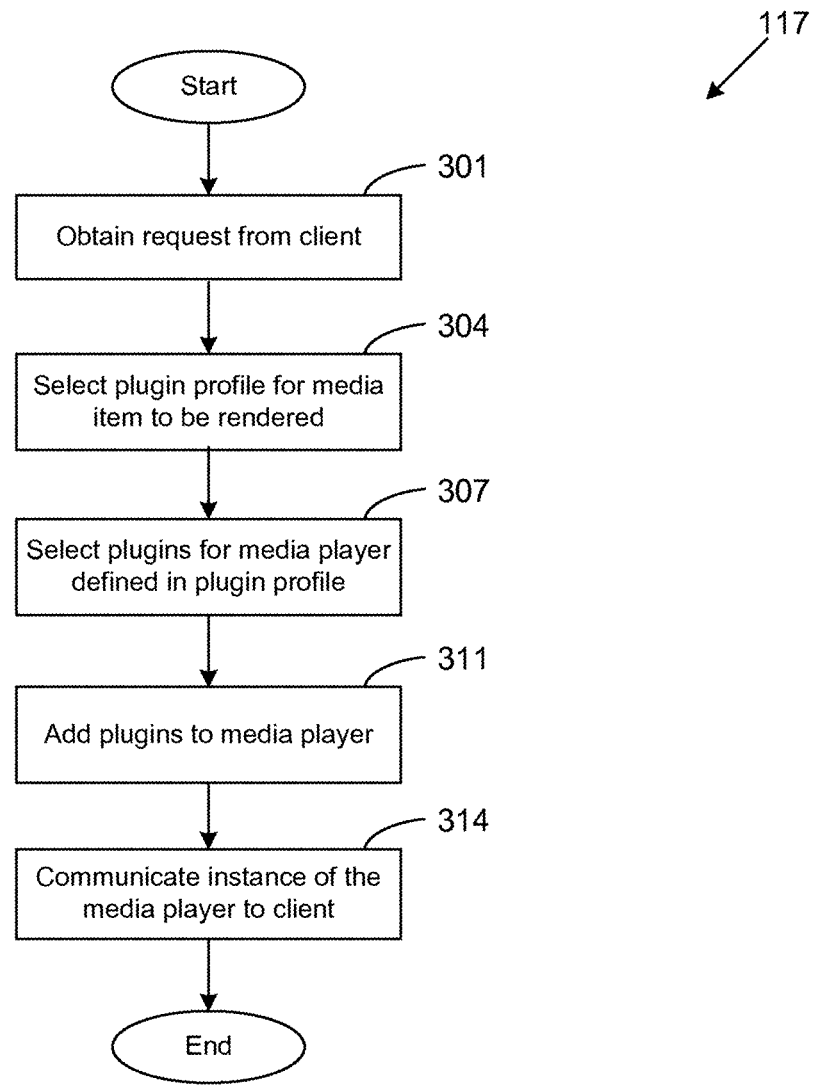
FIG. 3 is a flowchart illustrating one example of functionality implemented as portions of a player customization application executed in a computing environment in the networked environment of FIG. 1 according to various embodiments of the present disclosure.

Turning now to FIG. 3, shown is a flowchart that provides one example of the operation of a portion of the player customization application 117 according to various embodiments. It is understood that the flowchart of FIG. 3 provides merely an example of the many different types of functional arrangements that may be employed to implement the operation of the portion of the player customization application 117 as described herein. As an alternative, the flowchart of FIG. 3 may be viewed as depicting an example of steps of a method implemented in the computing environment 101 (FIG. 1) according to one or more embodiments.

Beginning with box 301, the player customization application 117 obtains a request 124 (FIG. 1) from a client 104 (FIG. 1). The request 124 may be communicated to the player customization application 117 from the client 104 via a network page server application 114 (FIG. 1) implemented in the computing environment 101. The request 124 may comprise a request 124 for a media item 127 (FIG. 1) or other data.

Next, in box 304, the player customization application 117 selects a plugin profile 141 for the requested media item 127. The plugin profile 141 may be selected as being defined with respect to the requested media item 127. The plugin profile 141 may also be defined with respect to a content provider, customer, or other entity associated with multiple media items 127 including the requested media item 127. The plugin profile 141 may also be a default plugin profile 141. The plugin profile 141 may also be selected by another approach.

After selecting the plugin profile 141, in box 307, the player customization application 117 selects those plugins 137 (FIG. 1) defined in the plugin profile 141 for inclusion in a media player 131 to be generated. The selected plugins 137 are then added to a media player 131 comprising a media player framework 134 (FIG. 1) in box 311. This may comprise copying, including, or otherwise referencing the selected plugins 137 in a file system, directory, or package structure accessible to the media player 131. This may also comprise recompiling or otherwise regenerating the media player 131 comprising the media player framework 134 to generate a new version of the media player 131. The plugins 137 may also be added to the media player 131 comprising the media player framework 134 by another approach.

Next, in box 314, the media player 131 comprising the media player framework 134 and the plugins 137 defined in the plugin profile 141 is communicated to the client 104 via the network 107 (FIG. 1) to facilitate a rendering of the media item 127 embodied in the request 124.

Figure 4:
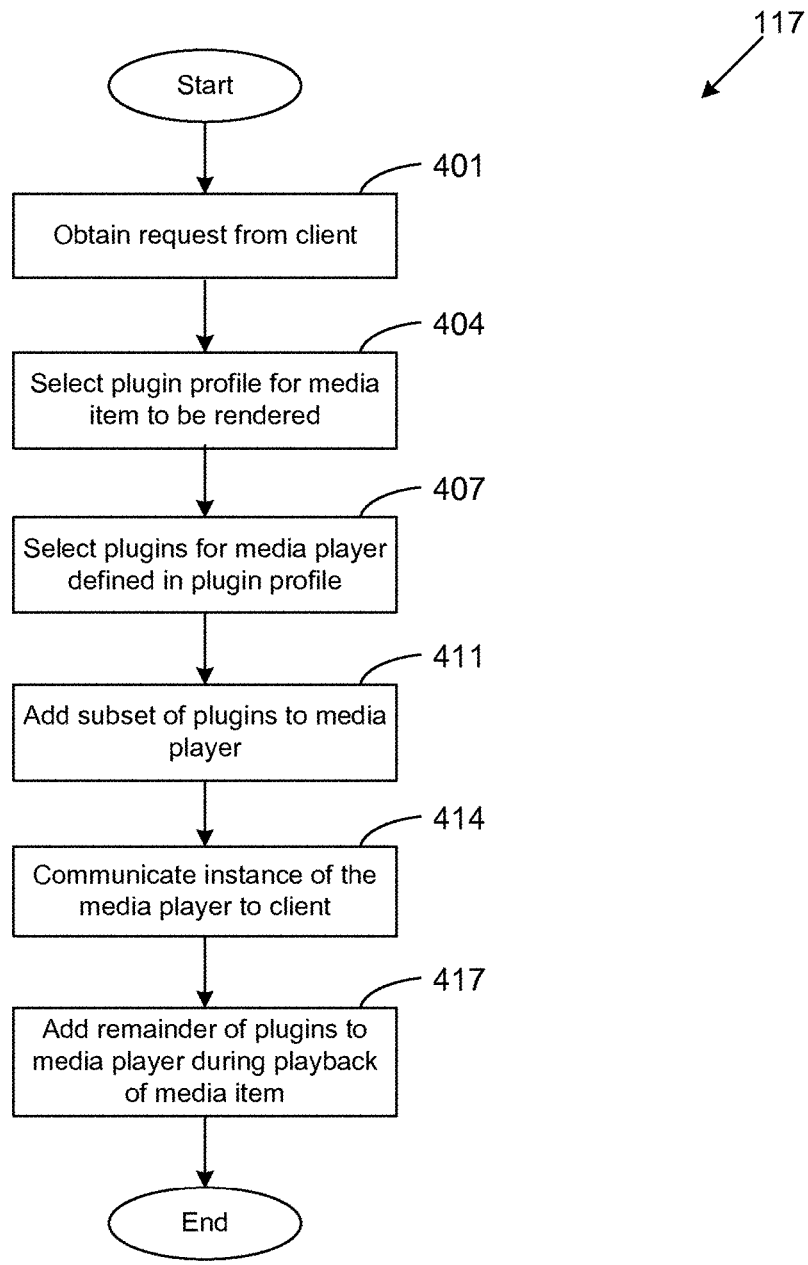
FIG. 4 is a flowchart illustrating one example of functionality implemented as portions of a player customization application executed in a computing environment in the networked environment of FIG. 1 according to various embodiments of the present disclosure.

Turning now to FIG. 4, shown is a flowchart that provides one example of the operation of a portion of the player customization application 117 according to various embodiments. It is understood that the flowchart of FIG. 4 provides merely an example of the many different types of functional arrangements that may be employed to implement the operation of the portion of the player customization application 117 as described herein. As an alternative, the flowchart of FIG. 4 may be viewed as depicting an example of steps of a method implemented in the computing environment 101 (FIG. 1) according to one or more embodiments.

Beginning with box 401, the player customization application 117 obtains a request 124 (FIG. 1) from a client 104 (FIG. 1). The request 124 may be communicated to the player customization application 117 from the client 104 via a network page server application 114 (FIG. 1) implemented in the computing environment 101. The request 124 may comprise a request 124 for a media item 127 (FIG. 1) or other data.

Next, in box 404, the player customization application 117 selects a plugin profile 141 for the requested media item 127. The plugin profile 141 may be selected as being defined with respect to the requested media item 127. The plugin profile 141 may also be defined with respect to a content provider, customer, or other entity associated with multiple media items 127 which include the requested media item 127. The plugin profile 141 may also be a default plugin profile 141. The plugin profile 141 may also be selected by another approach.

After selecting the plugin profile 141, in box 407, the player customization application 117 selects those plugins 137 (FIG. 1) defined in the plugin profile 141 for inclusion in a media player 142 to be generated by loading the defined plugins 137 from a data store 111 (FIG. 1) or by another approach. The player customization application 117 then adds a subset of the selected plugins 137 to a media player 131 comprising a media player framework 134 (FIG. in box 411.

In some embodiments, the subset of the plugins 137 to be added to the media player 131 may comprise a predefined subset of the plugins 137. In other embodiments, the subset of plugins 137 may be dynamically calculated by the player customization application 117. For example, the player customization application 117 may be configured to generate a media player 131 under a predefined data size threshold prior to communication to the client 104. The player customization application 117 may then add a subset of the selected plugins 137 to the media player 131 comprising the media player framework 134 such that the resulting generated media player framework 134 has a data size less than the threshold. The subset of plugins 137 added to the media player 131 prior to communication to the client 104 may also be dynamically generated by another approach.

Adding the plugins 137 to the media player 131 comprising the media player framework 134 may comprise copying, including, or otherwise referencing the selected plugins 137 in a file system, directory, or package structure accessible to the media player 131. This may also comprise recompiling or otherwise regenerating the media player 131 comprising the media player framework 134 to generate a new version of the media player 131. The plugins 137 may also be added to the media player 131 comprising the media player framework 134 by another approach.

Next, in box 414, an instance the media player 131 comprising the media player framework 134 and the subset of plugins 137 defined in the plugin profile 141 is communicated to the client 104 via the network 107 (FIG. 1) to facilitate a rendering of the media item 127 embodied in the request 124. During a rendering of the media item 127 by the client 104, in box 417, the player customization application 117 adds the remainder of the selected plugins 137 to the instance of the media player 131 executed in the client 104.

Communicating a plugin 137 to an instance of a generated media player 131 for addition to the generated media player 131 may comprise communicating a plugin 137 via the network 107 by accessing push functionality or an application program interface call exposed by the instance of the media player 131 executed in the client 104. In other embodiments, communicating a plugin 137 to an instance of a generated media player 131 for addition to the generated media player 131 may comprise the media player 131 being configured to automatically obtain the plugin 137 from the player customization application 117 via an exposed web service, application program interface, or by another approach.

Figure 5:
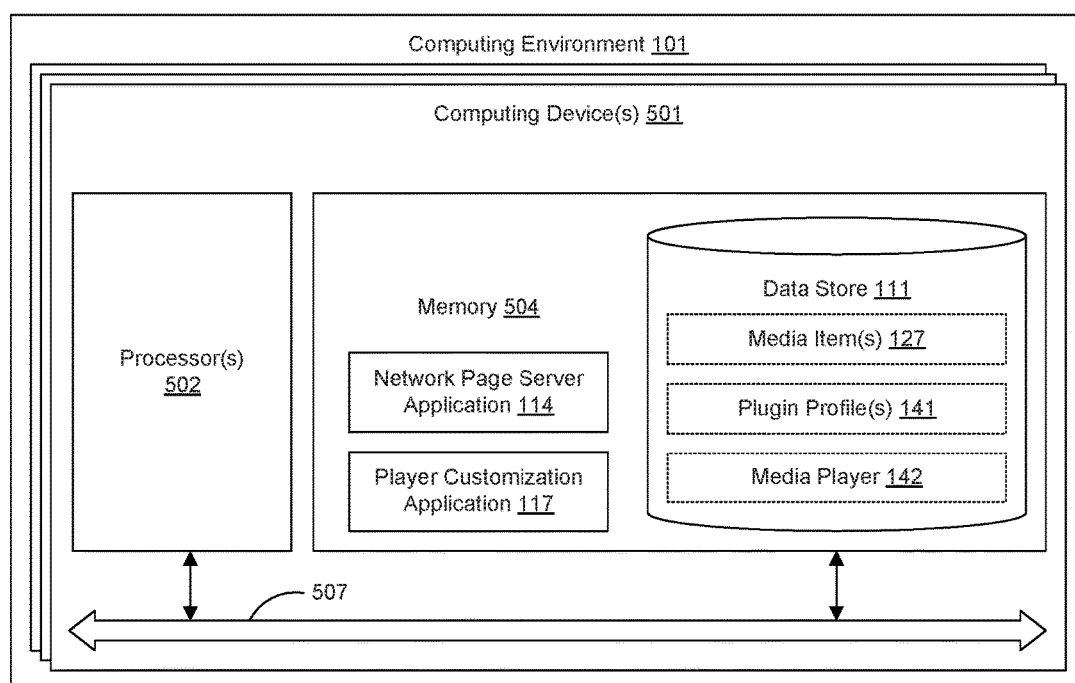
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 101 according to an embodiment of the present disclosure. The computing environment 101 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a network page server application 114, a player customization application 117, and potentially other applications. Also stored in the memory 504 may be a data store 111 storing media items 127, plugin profiles 141, media players 142, and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the player customization application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the player customization application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the player customization application 117, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions executable by at least one computing device, wherein, when executed, the plurality of computer instructions cause the at least one computing device to:

select a plurality of plugins defined in a plugin profile, the plugin profile corresponding to a media item;

determine a data size threshold for a first media player as a function of a playback length of the media item;

select a dynamically generated first subset of the plurality of plugins based at least in part on the data size threshold associated with the first media player;

add the dynamically generated first subset of the plurality of plugins to the first media player by recompiling the first subset of the plurality of plugins and the first media player;

generate a second media player having a first data size below the data size threshold, the generation of the second media player comprises generating at least one file that includes a media player framework associated with the first media player extended to execute functionality embodied by the first subset of the plurality of plugins;

after the second media player is generated, communicate the second media player to a client for embedding in a network page;

after the second media player is communicated to the client, determine an amount of available network bandwidth;

after the amount of available network bandwidth is determined, concurrent to the second media player rendering the media item, add a second subset of the plurality of plugins to the second media player, wherein the second subset of the plurality of plugins is based at least in part upon the data size threshold and the amount of available network bandwidth, thereby generating a third media player that enables functionality for another networked media service with respect to the media item in response to adding the second subset of the plurality of plugins; and wherein the second subset of the plurality of plugins comprises those of the plurality of plugins excluded from the first subset of the plurality of plugins, the second subset being excluded based at least in part upon the plugin profile indicating that the second subset may be added after the second media player is communicated to the client.

2. The non-transitory computer-readable medium of claim 1, wherein the plurality of plugins comprise at least one of a social media sharing plugin, an adaptive bitrate plugin, or a user interface skin plugin.

3. The non-transitory computer-readable medium of claim 1, wherein the plurality of computer instructions further cause the at least one computing device to encode for rendering a user interface to facilitate a creation of the plugin profile.

4. The non-transitory computer-readable medium of claim 1, wherein the plurality of plugins are organized into an ontology embodying dependencies between individual ones of the plurality of plugins.

5. The non-transitory computer-readable medium of claim 1, wherein the plugin profile is defined by a content provider of the media item.

6. The non-transitory computer-readable medium of claim 1, wherein the third media player enabling functionality for another networked media service further comprises implementing a content overlay user interface or a popup window concurrent to rendering the media item.

7. The non-transitory computer-readable medium of claim 1, wherein the plurality of plugins are retrieved from a web service.

8. A system, comprising:
at least one computing device; and
an application executable in the at least one computing device, the application executable causing the at least one computing device to:
determine, responsive to a request from a client for a first media player to facilitate a rendering of a media item embedded in a network content, a data size threshold for the first media player as a function of a playback length of the media item;
select at least one plugin among a plurality of plugins based at least in part on the data size threshold and a plugin profile defining the at least one plugin;
add the at least one plugin to the first media player by recompiling the at least one plugin and the first media player in response to selecting the at least one plugin among the plurality of plugins, the at least one plugin selected based at least in part on the data size threshold associated with the first media player;
generate a second media player having a first data size below the data size threshold, the generation of the second media player comprises generating at least one file that includes a media player framework associated with the first media player extended to execute functionality embodied by the at least one plugin;

after the second media player is generated, communicate an instance of the second media player to the client;
after the second media player is communicated to the client, determine an amount of available network bandwidth;
after the amount of available network bandwidth is determined, add a subset of a remainder of the plurality of plugins to the second media player concurrently to the second media player rendering the media item, wherein the subset of the remainder of the plurality of plugins is based at least in part upon the data size threshold and the amount of available network bandwidth, thereby generating a third media player that enables functionality for another networked media service with respect to the media item in response to adding the subset of the remainder of the plurality of plugins; and
wherein the subset of the remainder of the plurality of plugins comprises those of the plurality of plugins excluded from the at least one plugin among the plurality of plugins, the subset being excluded based at least in part upon the plugin profile indicating that the subset may be added after the second media player is communicated to the client.

9. The system of claim 8, wherein the at least one plugin is added to the first media player before communicating the instance of the second media player.

10. The system of claim 8, wherein the application further causes the at least one computing device to communicate the at least one plugin to the instance of the second media player concurrently to an execution, by the client, of the instance of the second media player rendering the media item.

11. The system of claim 8, wherein the at least one plugin comprises an adaptive bitrate plugin.

12. The system of claim 8, wherein the plugin profile is defined with respect to the media item.

13. The system of claim 8, wherein the application further causes the at least one computing device to:
encode for rendering a user interface to facilitate a creation of the plugin profile; and
encode in the user interface a preview window that displays a preview of the media item being rendered in a respective media player executing a plurality of respective plugins defined by the plugin profile.

14. The system of claim 8, wherein the plugin profile is defined by a content provider of the media item.

15. The system of claim 8, wherein the at least one plugin comprises a social media sharing plugin.

16. The system of claim 8, wherein the at least one plugin comprises a user interface skin plugin.

17. A method, comprising:
selecting, in a computing device, responsive to a request from a client for a first media player to facilitate a rendering of a media item embedded in a network page, a plurality of plugins based at least in part on a plugin profile associated with the media item;
determining, in the computing device, a data size threshold for the first media player as a function of a playback length of time of the media item;
selecting, in the computing device, a first subset of the plurality of plugins based at least in part on a data size threshold associated with the first media player;
adding, in the computing device, the first subset of the plurality of plugins to the first media player by recompiling the first subset of the plurality of plugins and the first media player;

generating, in the computing device, a second media player having a first data size below the data size threshold, the generation of the second media player comprises generating at least one file that includes a media player framework associated with the first media player extended to execute functionality embodied by the first subset of the plurality of plugins;

communicating, in the computing device, the second media player to the client;

after communicating the second media player to the client, determining, in the computing device, an amount of available network bandwidth;

adding, in the computing device, after determining the amount of available network bandwidth, a second subset of the plurality of plugins to the second media player, wherein the second subset of the plurality of plugins is based at least in part upon the data size threshold and the amount of available network bandwidth, thereby generating a third media player that enables functionality for another networked media service with respect to the media item in response to adding the second subset of the plurality of plugins; and wherein the second subset of the plurality of plugins comprises those of the plurality of plugins excluded from the first subset of the plurality of plugins, the second subset being excluded based at least in part upon the plugin profile indicating that the second subset may be added after the second media player is communicated to the client.

18. The method of claim 17, wherein the plugin profile is one of a plurality of plugin profiles, the media item is one of a plurality of media items, and the plurality of plugin profiles define a selection of the plurality of plugins with respect to a corresponding one of the plurality of media items.

19. The method of claim 17, wherein the second subset of the plurality of plugins is added to the second media player concurrent to the media item being rendered by the client.

20. The method of claim 17, further comprising encoding, in the computing device, for rendering a user interface to facilitate a generation of the plugin profile.

* * * * *